United States Patent
Pan et al.

(10) Patent No.: US 8,036,856 B2
(45) Date of Patent: *Oct. 11, 2011

(54) METHOD AND APPARATUS FOR AUTOMATICALLY ADJUSTING SPECTRAL DOPPLER GAIN

(75) Inventors: Lihong Pan, Brookfield, WI (US); David Thomas Dubberstein, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 1711 days.

This patent is subject to a terminal disclaimer.

(21) Appl. No.: 11/291,250

(22) Filed: Dec. 1, 2005

(65) Prior Publication Data

US 2007/0164898 A1    Jul. 19, 2007

(51) Int. Cl.
*A61B 8/06* (2006.01)

(52) U.S. Cl. ........ 702/191; 702/107; 702/189; 702/190; 600/453; 600/454; 600/455; 600/456; 73/861.25

(58) Field of Classification Search ............... 702/107, 702/189, 190, 191; 600/453–456; 73/861.25
See application file for complete search history.

(56) References Cited

U.S. PATENT DOCUMENTS

| | | | |
|---|---|---|---|
| 5,935,074 A | 8/1999 | Mo et al. | |
| 6,390,983 B1 * | 5/2002 | Mo et al. | 600/453 |
| 6,512,854 B1 * | 1/2003 | Mucci et al. | 382/275 |
| 6,577,967 B2 | 6/2003 | Mo et al. | |
| 6,663,566 B2 * | 12/2003 | Pan et al. | 600/454 |
| 2006/0092930 A1 * | 5/2006 | Shah | 370/389 |

* cited by examiner

*Primary Examiner* — Sujoy Kundu

(74) *Attorney, Agent, or Firm* — Dean D. Small; The Small Patent Law Group

(57) ABSTRACT

Method and apparatus for automatically adjusting a parameter used in the display of a Doppler spectral image comprises acquiring a plurality of spectral lines of Doppler data. A subset of Doppler data is determined from the plurality of spectral lines of Doppler data. A noise characteristic of the subset of Doppler data is calculated, and a signal characteristic of the subset of Doppler data is identified. The noise and signal characteristics are compared, and a system parameter is adjusted based on a result of the comparing step.

9 Claims, 4 Drawing Sheets

METHOD AND APPARATUS FOR AUTOMATICALLY ADJUSTING SPECTRAL DOPPLER GAIN

BACKGROUND OF THE INVENTION

This invention relates generally to ultrasonic diagnostic systems which measure the velocity of blood flow using spectral Doppler techniques, and in particular, to automatically adjusting spectral Doppler gain to provide an optimal display for an operator.

Ultrasonic scanners for detecting blood flow based on the Doppler effect are well known. An ultrasonic transducer array transmits ultrasonic waves into an object and receives backscattered ultrasonic echoes. In the measurement of blood flow characteristics, returning ultrasonic waves are compared to a frequency reference to determine the frequency shift imparted to the returning waves by flowing scatterers, such as blood cells. This frequency shift translates into the velocity of the blood flow.

Typical clinical Doppler exams can be time-consuming and involve adjustment of a variety of control keys and switches for setting and adjusting scanning parameters such as sample volume size or sampling gate, flow direction, cursor angle, velocity limits or pulse repetition frequency (PRF), baseline shift and invert, auto max/mean velocity trace, and system gain. Some automation is available, such as for detecting the noise background and signal intensity within the waveform, and for eliminating aliasing by automatically adjusting the PRF. However, there remains a need for automating other Doppler adjustments in order to improve both the speed and reliability of the Doppler exam.

The pulsed or continuous wave (CW) Doppler waveform is computed and displayed in real-time as a spectrum or spectral image of Doppler frequency (or velocity) versus time with the gray-scale intensity (or color) modulated by the spectral power. Each spectral line represents an instantaneous measurement of blood flow within the sampling gate. The data in each spectral line comprises a plurality of frequency bins for different frequency intervals and the signal strength (power) associated with each frequency bin is displayed in a corresponding pixel location on the display. All of the spectral lines taken together form a spectrogram or spectrum.

Each vertical line in the spectrum corresponds to a Doppler frequency spectrum at a given time instant. Positive Doppler frequencies correspond to flow towards the transducer, and negative frequencies correspond to flow away from the transducer, as referenced by a baseline at frequency equal to zero.

Typically, the operator has to adjust system parameters, such as the gain, to adjust the spectrum which is displayed. For example, the signal component of the spectrum may be small and thus difficult to distinguish from the noise component. Alternatively, the signal component may be very high, causing the monitor to saturate and not display the full range of data. In both cases, the system needs to be adjusted manually by the operator. This can be time consuming and can lead to error and/or difficulty in diagnosis if the system parameters are not set properly.

Therefore, a need exists for automatically adjusting system parameters of the ultrasound system during spectral Doppler imaging so that the flow signal and noise background are displayed at optimal brightness levels. Certain embodiments of the present invention are intended to meet these needs and other objectives that will become apparent from the description and drawings set forth below.

BRIEF DESCRIPTION OF THE INVENTION

In one embodiment, a method for automatically adjusting a parameter used in the display of a Doppler spectral image comprises acquiring a plurality of spectral lines of Doppler data. A subset of Doppler data is determined from the plurality of spectral lines of Doppler data. A noise characteristic of the subset of Doppler data is calculated, and a signal characteristic is identified. The noise and signal characteristics are compared, and a system parameter is adjusted based on a result of the comparison.

In another embodiment, an ultrasound system for acquiring Doppler spectral data and automatically adjusting a parameter used in the display of a Doppler spectrum comprises a transducer transmitting and receiving ultrasound signals within a scan plane of a subject. A beamformer derives data samples representative of the ultrasound signals for a sample gate within the scan plane. A Doppler processing module generates a set of raw frequency bins of Doppler data from the data samples, and a scan conversion module scan converts the set of raw frequency bins of Doppler data. A control processing module analyses a plurality of spectral lines of Doppler data to identify a noise characteristic and a signal characteristic. The control processing module automatically adjusts a system parameter based on a comparison of the noise and signal characteristics. A display architecture displays the Doppler spectrum corresponding to the sample gate within the scan plane.

In another embodiment, a method for automatically adjusting spectral gain of a spectrum displayed on a monitor of an ultrasound system comprises determining noise intensity and a predetermined level of frequency based on a plurality of spectral lines of Doppler data acquired for a period of time. Signal intensity is calculated as a function of the period of time at a frequency based on the predetermined level of frequency and zero frequency. A signal component is identified within the signal intensity and system gain is adjusted based on a comparison of the signal component and the noise intensity.

Figure 1:
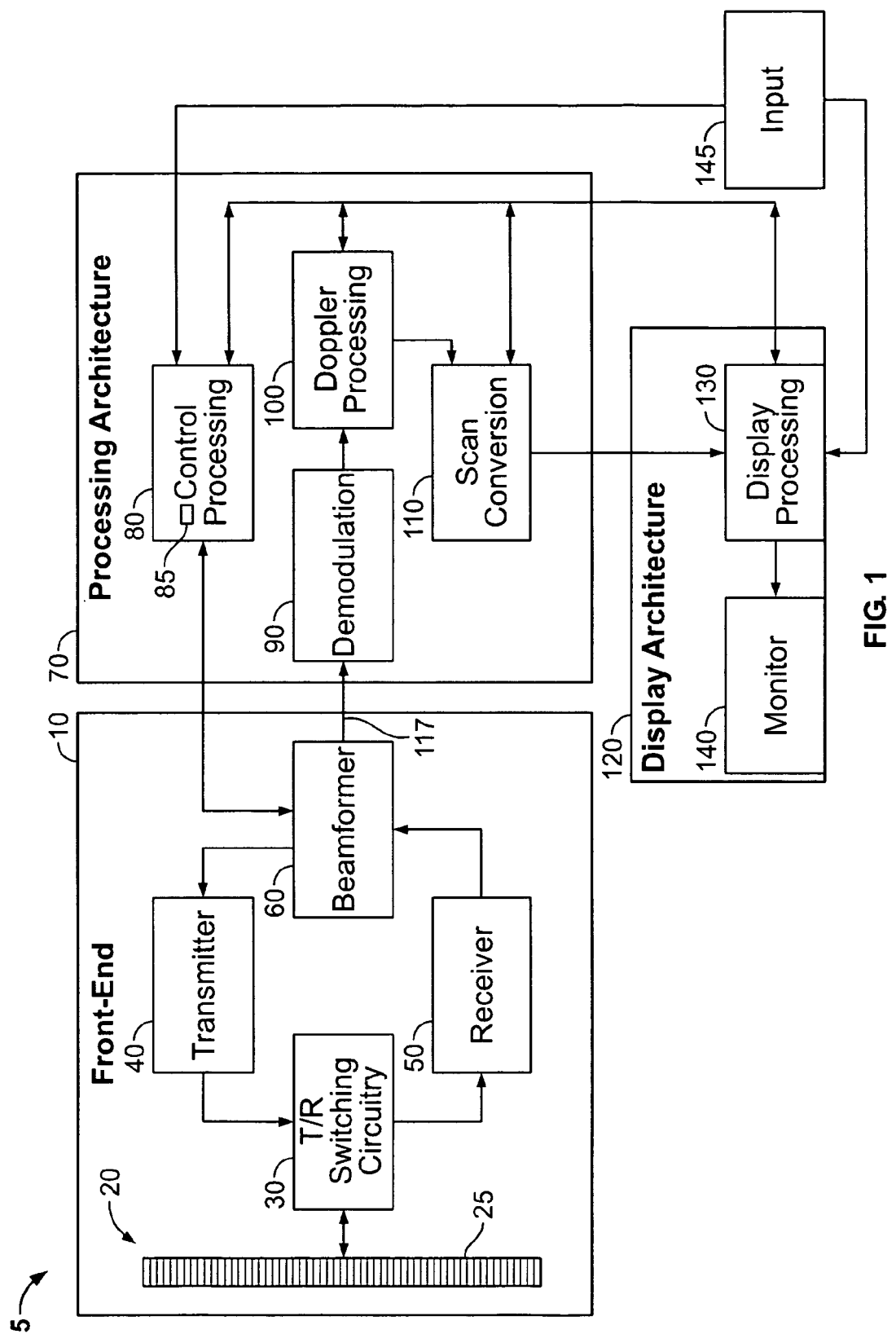
FIG. 1 is a schematic block diagram of an ultrasound system in accordance with an embodiment of the present invention

The foregoing summary, as well as the following detailed description of certain embodiments of the present invention, will be better understood when read in conjunction with the appended drawings. The figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION OF THE INVENTION

FIG. 1 is a schematic block diagram of an ultrasound system 5 for generating and controlling a spectral Doppler image in accordance with an embodiment of the present invention. The illustrated elements of the ultrasound system 5 are the front-end 10, the processing architecture 70, the display architecture 120, and the input 145. Front-end 10 comprises a transducer array 20 (comprising a plurality of transducer array elements 25), transmit/receive switching circuitry 30, a transmitter 40, a receiver 50, and a beamformer 60. Processing architecture 70 comprises a control processing module 80 having an Automatic Spectral Gain Adjustment 85, a demodulation module 90, a Doppler processing module 100, and a scan conversion module 110. Display architecture 120 comprises a display processing module 130 and a monitor 140. The input 145 may comprise a keyboard, trackball, microphone, switches, knobs, control keys, and the like.

The architectures and modules may be dedicated hardware elements such as circuit boards with digital signal processors or may be software running on a general purpose computer or processor such as a commercial, off-the-shelf PC. The various architectures and modules may be combined or separated, and thus are not limited to the configurations illustrated.

In the front-end 10, the transducer array 20 is connected to transmit/receive (T/R) switching circuitry 30. The T/R switching circuitry 30 is connected to the output of transmitter 40 and the input of receiver 50. The output of receiver 50 is input to beamformer 60. The beamformer 60 is further connected to the input of transmitter 40, to the control processing module 80 and the input of the demodulation module 90 in processing architecture 70.

In the processing architecture 70, the output of the demodulation module 90 is connected to an input of the Doppler processing module 100. Control processing module 80 interfaces to the Doppler processing module 100, scan conversion module 110, display processing module 130 in the display architecture 120, and input 145. An output of the Doppler processing module 100 is connected to an input of scan conversion module 110. An output of scan conversion module 110 is connected to an input of the display processing module 130 in display architecture 120, and the output of the display processing module 130 is connected to the input of the monitor 140. An output of the input 145 is connected to the display processing module 130.

To generate a transmitted ultrasound beam, the control processing module 80 sends command data to the beamformer 60 which tells the beamformer to generate transmit parameters to create a beam of a certain shape that originates from a certain point at the surface of the transducer array 20 at a certain steering angle. The transmit parameters are sent from the beamformer 60 to the transmitter 40. The transmitter 40 uses the transmit parameters to properly encode transmit signals to be sent to the transducer array 20 through the T/R switching circuitry 30. The transmit signals are set at certain levels and phases with respect to each other and are provided to individual transducer elements 25 of the transducer array 20. The transmit signals excite the transducer elements 25 of the transducer array 20 to emit ultrasound waves with the same phase and level relationships. As a result, a transmitted beam of ultrasound energy is formed in a subject within a scan plane 150 (see FIG. 2) along a scan line 155 when the transducer array 20 is acoustically coupled to the subject by using, for example, ultrasound gel. This process is known as electronic scanning.

The transducer array 20 is a two-way transducer. Once ultrasound waves are transmitted into a subject, the ultrasound waves are backscattered off of tissue and blood sample within the structure. The backscattered waves arrive at the transducer array 20 at different times, depending on the distance into the tissue they return from and the angle with respect to the surface of the transducer array 20 at which they return. The transducer elements 25 of the transducer array 20 are responsive to the backscattered waves and convert the ultrasound energy from the backscattered waves into received electrical signals.

The received electrical signals are routed through the T/R switching circuitry 30 to the receiver 50. The receiver 50 amplifies and digitizes the received signals and provides other functions such as gain compensation. The digitized received signals correspond to the backscattered waves received by each transducer element 25 at various times and preserve the amplitude and phase information of the backscattered waves.

The digitized received signals are sent to beamformer 60. The control processing module 80 sends command data to beamformer 60, which uses the command data to form a receive beam originating from a point on the surface of transducer array 20 at a steering angle typically corresponding to the point and steering angle of the previous ultrasound beam transmitted along the scan line 155. The beamformer 60 operates on the appropriate received signals by performing time delaying and focusing, according to the instructions of the command data from the control processing module 80, to create received beam signals corresponding to sample volumes along the scan line 155 in the scan plane 150 within the subject. The phase, amplitude, and timing information of the received signals from the various transducer elements 25 is used to create the received beam signals. For the spectral Doppler imaging mode, the received signals corresponding to sample volume locations within the sample gate 160 (FIG. 2) are further processed to generate a spectral Doppler timeline display on the monitor 140.

The received beam signals are sent to processing architecture 70 over digital interface 117. Demodulation module 90 performs demodulation on the received beam signals to create pairs of I and Q demodulated data values corresponding to sample volumes within the sample gate 160. Demodulation is accomplished by comparing the phase and amplitude of the received beam signals to a reference frequency. The I and Q demodulated data values preserve the phase and amplitude information induced by Doppler shifts in the received signals.

The demodulated data is transferred to Doppler processing module 100. The Doppler processing module 100 uses standard techniques such as discrete Fourier transform (DFT) processing to generate a set of spectral Doppler data corresponding to the signals received from the sample gate 160. The spectral Doppler data is stored in memory as spectral lines as shown in FIG. 3.

Figure 3:
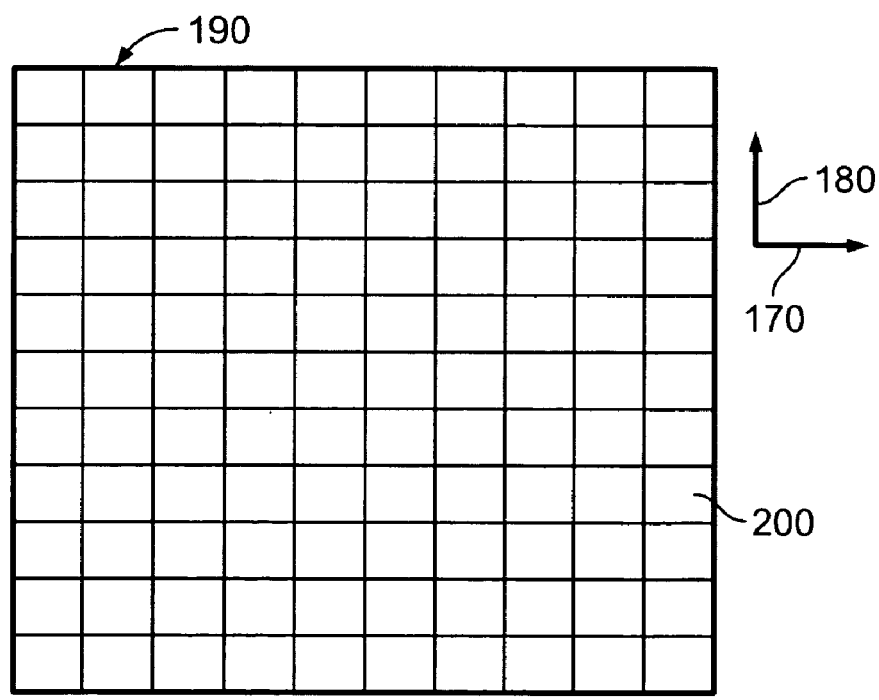
FIG. 3 illustrates a subset of spectral lines and frequency bins representing blood flow in the sample gate.

FIG. 3 illustrates a subset of spectral lines wherein the horizontal dimension is time 170 and the vertical dimension is Doppler frequency 180. Spectral lines are represented as vertical columns and are each broken up into a set of frequency (velocity) bins. A spectral line 190 represents the Doppler frequency content (i.e. velocity content) of the blood flow in the sample gate 160 at a particular instant in time, and frequency bin 200 contains the signal data for a particular velocity corresponding to the sample gate 160 over time.

The spectral lines 190 of Doppler frequency data are passed to the scan conversion module 110, which performs a translation from scan sequence format to display format. The translation includes performing interpolation operations on the spectral lines 190 of Doppler frequency data to create spectral display pixel data in the time versus frequency display format. Therefore, each frequency bin 200 has a corresponding pixel intensity with respect to a spectrum displayed on the monitor 140.

The scan converted pixel data is sent to display architecture 120. The display architecture 120 comprises a display processing module 130 to perform any final spatial or temporal filtering of the scan converted pixel data, to apply grayscale or color to the scan converted pixel data, and to convert the digital pixel data to analog data for display on monitor 140. The operator may use the input 145 to adjust scanning, system and/or display parameters.

Figure 4:
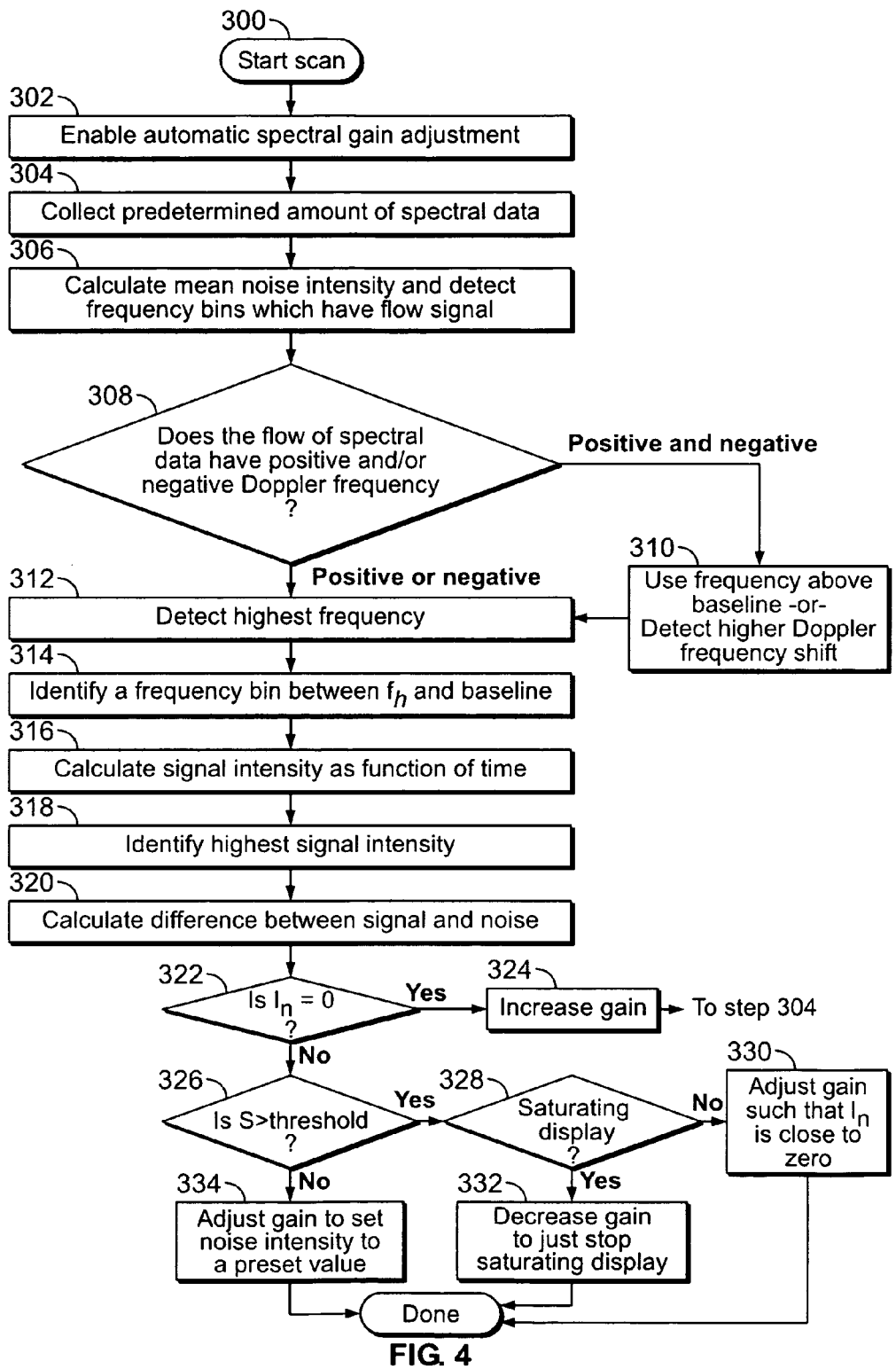
FIG. 4 illustrates a method for automatically setting a system parameter to display noise and flow signal at optimal intensity in accordance with an embodiment of the present invention.

FIG. 4 illustrates a method for automatically setting a system parameter to display the noise and flow signal at optimal intensity on the monitor 140 in accordance with an embodiment of the present invention. For example, both the noise background and the flow signal intensities are a function of the system gain, and increasing the system gain increases both the noise and signal intensities. It should be understood that other system parameters may be used to adjust one or both of the noise background and the flow signal intensity. The optimal intensity may be defined as a setting which best displays the flow signal while minimizing the noise. The optimal intensity may be set based on the ultrasound system 5 being used, the type of anatomy being scanned, and/or operator preference.

In step 300, the operator scans a patient with the ultrasound system 5 to achieve the desired view, data, and the like. The data is processed and displayed on the monitor 140 as it is acquired. The sample gate 160 is adjusted by the operator to include the desired spectral data. Other automatic and/or operator invoked processes may operate upon the spectral data, such as anti-aliasing.

In step 302, the operator enables the Automatic Spectral Gain Adjustment 85. The Automatic Spectral Gain Adjustment 85 will automatically adjust the display of the spectrum on the monitor 140 to the optimal intensity so that the noise component is minimized and the flow signal component is maximized without saturating the monitor 140. The operator may use the input 145 to select a button, switch, or knob, or use a microphone which accepts a voice activated command. Optionally, the Automatic Spectral Gain Adjustment 85 may be automatically invoked within a protocol. In step 304, the ultrasound system 5 collects a predetermined amount of spectral data, such as approximately one second of spectral data.

Figure 2:
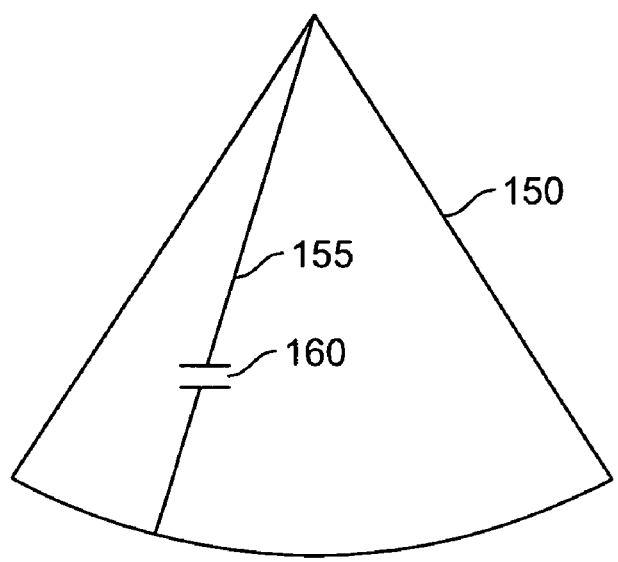
FIG. 2 illustrates a sector scan with a sample gate along a scan line for a spectral Doppler mode.
Figure 5:
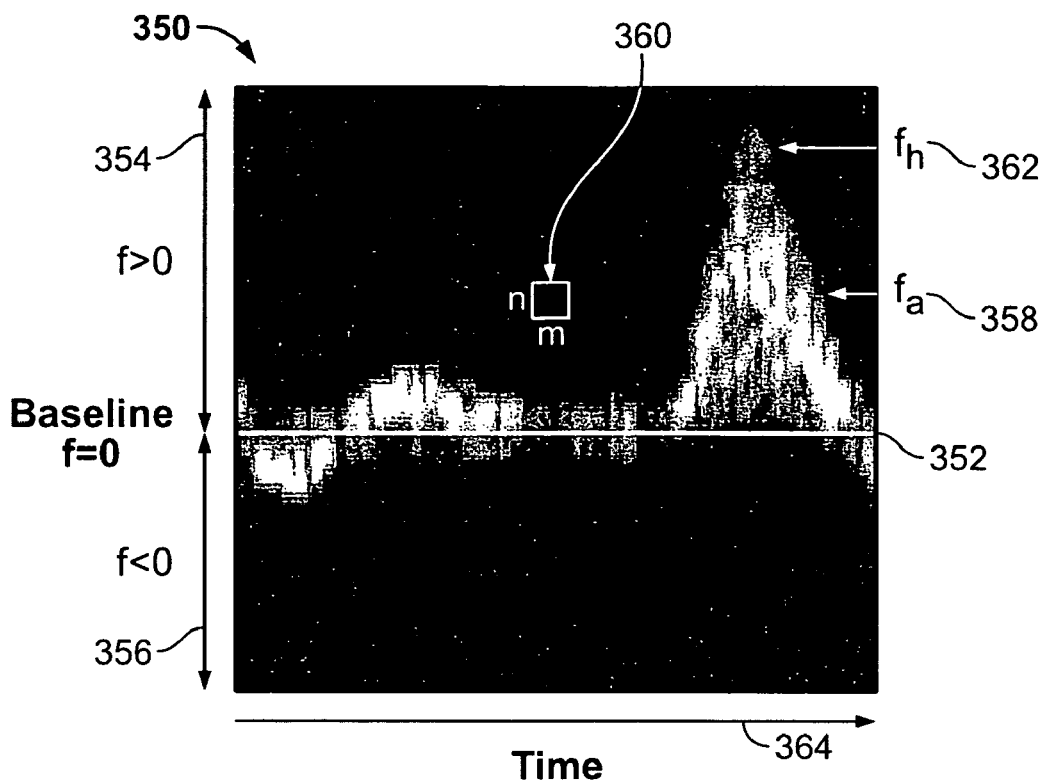
FIG. 5 illustrates a spectrum of approximately one second of spectral data acquired in accordance with an embodiment of the present invention.

FIG. 5 illustrates a spectrum 350 of approximately one second of spectral data acquired in accordance with an embodiment of the present invention. For example, the spectrum 350 may represent the spectral lines of data over time 364 corresponding to the sample gate 160 (FIG. 2). It should be understood that more or less spectral data may be acquired. Baseline 352 is the zero Doppler frequency reference of the display, and the flow of the spectrum 350 can have positive Doppler frequency 354 (above the baseline 352), negative Doppler frequency 356 (below the baseline 352), or both. For ease of viewing, the spectrum 350 may be adjusted such that there is no aliasing. Additionally, the spectrum 350 is not inverted (i.e. positive Doppler shifts are shown as being above the baseline 352 and negative Doppler shifts are shown as being below the baseline 352).

Returning to FIG. 4, in step 306, the Automatic Spectral Gain Adjustment 85 and/or control processing module 80 calculates a noise characteristic, such as mean noise intensity $I_n$, and detects the frequency bins 200 which have flow signal for the spectrum 350. Although the mean noise intensity $I_n$ is calculated, it should be understood that other noise characteristics may be used as well, such as a maximum or minimum noise characteristic. The mean noise intensity $I_n$ and flow signal may be calculated using known methods, processes and equations. In step 308, the control processing module 80 determines whether the flow signal of the spectrum 350 has a positive Doppler frequency 354 and/or a negative Doppler frequency 356. If the flow signal has either a positive Doppler frequency 354 or a negative Doppler frequency 356, but not both, the method passes to step 312. If the spectrum 350 has both positive Doppler frequency 354 and negative Doppler frequency 356, the method passes to step 310.

When the flow of the spectrum 350 has both positive and negative Doppler frequencies 354 and 356, the method may operate in one of two manners. In one embodiment, the control processing module 80 uses only the frequency data above the baseline 352 to determine a signal characteristic of the subset of Doppler data. By way of example, a greatest or highest signal intensity $I_s(t_h, f_a)$, or an average or mean signal intensity may be determined. Alternatively, the control processing module 80 may detect which of the Doppler frequencies 354 and 356 has a higher shift. The side with the higher Doppler frequency shift is then used to determine the signal intensity $I_s(t_h, f_a)$.

The method passes from both steps 308 and 310 to step 312, where the control processing module 80 detects a predetermined level of frequency, such as the highest frequency bin $f_h$ 362 within the flow signal of the spectrum 350. In step 314, the control processing module 80 identifies a frequency bin $f_a$ 358, located between the highest frequency bin $f_h$ 362 and the baseline 352. In this example, the frequency bin $f_a$ 358 is approximately half-way between the highest frequency bin $f_h$ 362 and the baseline 352. It should be understood that the frequency bin $f_a$ 358 may be located at other frequencies between the highest frequency bin $f_h$ 362 and the baseline 352. In step 316, the control processing module 80 calculates the signal intensity, $I_s(t, f_a)$, as a function of time.

Figure 6:
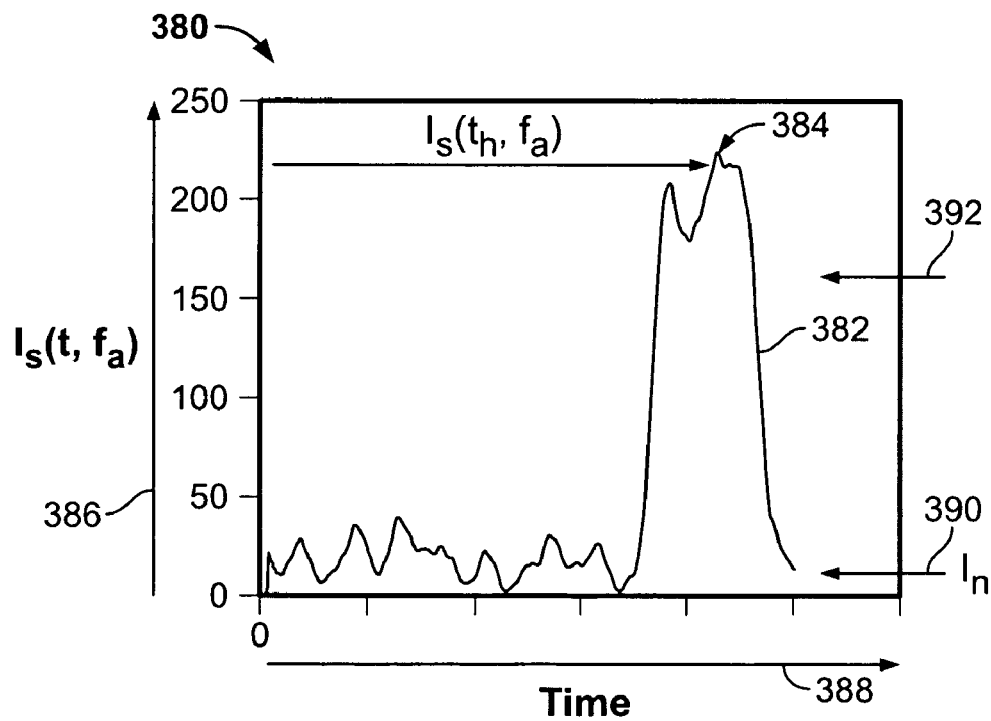
FIG. 6 illustrates a graph of the signal intensity as a function of time at the frequency of the frequency bin $f_a$ in accordance with an embodiment of the present invention.

FIG. 6 illustrates a graph 380 of the signal intensity 386 as a function of time 388 at the frequency of the frequency bin $f_a$ 358 in accordance with an embodiment of the present invention. Line 382 represents $I_s(t, f_a)$, which is the average intensity with a kernel 360 having a size of n frequency bins and m timelines, and may be calculated using Equation 1:

$$I_s(t_i, f_a) = \sum_{t=t_i-\frac{m-1}{2}}^{t_i+\frac{m-1}{2}} \sum_{f=f_a-\frac{n-1}{2}}^{f_a+\frac{n-1}{2}} \frac{I(t, f)}{n \cdot m}. \qquad \text{Equation 1}$$

In step 318, the control processing module 80 identifies the highest signal intensity $I_s(t_h, f_a)$ along $I_s(t, f_a)$ 386, or the highest signal intensity 384 along line 382. As stated previously, other components or characteristics of the Doppler data may be used. In step 320, the control processing module 80 calculates the difference between the highest signal intensity 384 and the mean noise intensity $I_n$ 390 (previously calculated in step 306) with Equation 2:

$$S = I_s(t_h, f_a) - I_n \qquad \text{Equation 2}$$

The optimal gain determination depends, in part, upon how much larger the highest signal intensity 384 is in relation to the mean noise intensity $I_n$ 390. In step 322, if the mean noise intensity $I_n$ 390 is zero, the method passes to step 324 where a system parameter is adjusted, such as increasing the system gain, then returns to step 304 to collect and evaluate the spectral data. Alternatively, a limit for the mean noise intensity $I_n$ 390 may be predetermined, below which the system gain is increased. If the gain can be changed within a range of 1 to 10, the gain may be increased by 1, for example. The increase in system gain may be communicated by the control processing module 80 to the receiver 50 or other appropriate circuitry. The increase in gain is reflected by an increase in the brightness of the spectrum 350 displayed on the monitor 140.

Returning to step 322, if the mean noise intensity $I_n$ 390 does not equal zero, the method passes to step 326, where the control processing module 80 determines whether the signal S, calculated by Equation 2, is greater than a predetermined threshold 392. The predetermined threshold 392 may be used to determine whether the signal S is strong or weak. By way of example only, the predetermined threshold 392 may be defined at a desired level above the mean noise intensity $I_n$ 390.

If the signal S is greater than the predetermined threshold 392, the signal S is strong and the method passes to step 328 where the control processing module 80 determines whether the signal S is saturating the monitor 140. Saturation may be described as the point at which the maximum brightness displayed on the monitor 140 is being exceeded by one or more pixels. Therefore, all saturated pixels are displayed at the brightest level, regardless of the level of signal present at that point. Saturated pixels that represent a higher signal content are displayed the same as saturated pixels that represent a lower signal content, and thus not all of the signal data is being displayed properly to the operator. By way of example, the control processing module 80 may communicate with the display processing module 130 to determine if any pixels on the monitor 140 are saturated.

If the monitor 140 is not being saturated, the method passes to step 330. For a strong signal S which is not saturating the monitor 140, the system parameter may be adjusted. For example, the system gain may be set such that the mean noise intensity $I_n$ 390 is very close to zero. This prevents the monitor 140 from displaying a majority of the noise while still displaying all of the signal S.

Returning to step 328, if the signal S is strong and saturating the monitor 140, the method passes to step 332 where the control processing module 80 requests that the system gain be reduced or decreased to the point where the signal S is just below the saturation point of the monitor 140.

Returning to step 326, if the signal S is less than the predetermined threshold 392, the signal S is considered to be weak and the method passes to step 334. For the case of a weaker signal S, the gain is set such that the mean noise intensity $I_n$ 390 is equal to a preset value. This results in a display where the noise background is visible and the signal intensity is not too weak. The preset value may be a selected by a manufacturer, an operator, based on noise levels within the ultrasound system 5 and the like.

After the system gain has been adjusted in steps 330, 332 and 334, the Automatic Spectral Gain Adjustment 85 is complete. Alternatively, once the Automatic Spectral Gain Adjustment 85 is enabled in step 302, the control processing module 80 may repeat the gain adjustment process at regular intervals or if the imaging parameter has changed, such as sample gate position, size, and the like. Optionally, a protocol may enable the Automatic Spectral Gain Adjustment 85 without intervention from the operator.

A technical effect of the Automatic Spectral Gain Adjustment 85 is that the ultrasound system 5 can automatically set a system parameter, such as system gain, to display the noise and signal at the optimal intensity or brightness. The Automatic Spectral Gain Adjustment 85 is easily invoked through an operator input, such as a button or voice command. The noise and signal levels are acquired and compared to each other and/or threshold levels to determine whether the system gain should be adjusted. The system gain can be increased to increase the intensity of a weak signal level and decreased to decrease the intensity of a strong signal level, ensuring that the strong signal is not saturating the display.

While the invention has been described in terms of various specific embodiments, those skilled in the art will recognize that the invention can be practiced with modification within the spirit and scope of the claims.

What is claimed is:

1. A method for automatically adjusting a parameter used in the display of a Doppler spectral image, comprising:
   acquiring a plurality of spectral lines of Doppler data;
   determining a subset of Doppler data from the plurality of spectral lines of Doppler data;
   calculating a noise characteristic of the subset of Doppler data;
   identifying a signal characteristic of the subset of Doppler data using a signal characteristic determination based on whether a flow for the plurality of spectral lines of Doppler data has a positive frequency, a negative frequency, or both;
   comparing the noise and the signal characteristics using a computer;
   adjusting a system parameter based on a result of the comparing step using the computer, wherein the system parameter comprises a system gain and the adjusting is relative to a saturation point of a monitor displaying the subset of Doppler data.

2. The method of claim 1, further comprising adjusting the signal characteristic when the signal characteristic is greater than a threshold based on an optimal intensity.

3. The method of claim 1, further comprising:
   comparing the signal characteristic to a threshold based on an optimal intensity;
   when the signal characteristic is greater than the threshold, determining if a monitor is being saturated; and
   adjusting the system parameter when the monitor is being saturated.

4. The method of claim 1, wherein the system parameter further comprises system gain, the method further comprising:
   displaying the subset of Doppler data on a monitor;
   determining if the monitor is being saturated; and
   decreasing the system gain if the monitor is being saturated.

5. The method of claim 1, further comprising adjusting the system parameter to set the noise characteristic to a preset value when the signal characteristic is less than a threshold, the threshold being defined at a predetermined level above the noise characteristic.

6. The method of claim 1, wherein the system parameter further comprises system gain, the method further comprising increasing the system gain when the noise characteristic is equal to zero.

7. The method of claim 1, further comprising:
   displaying the subset of Doppler data on a monitor;
   determining if the monitor is being saturated; and
   when the monitor is not being saturated, adjusting the system parameter until the noise characteristic is substantially zero.

8. The method of claim 1, further comprising:
   displaying the subset of Doppler data on a monitor; and adjusting the system parameter when the monitor is being saturated, the system parameter adjusting the signal characteristic relative to a display saturation point.

9. The method of claim 1, wherein the adjusting comprises adjusting a display of a spectrum on a monitor corresponding to the subset of Doppler data, such that the noise characteristic is minimized and a flow signal characteristic is maximized, without saturating the monitor.

* * * * *